Oct. 22, 1946.  A. C. SCHWENKER  2,409,804
MILK PAIL ATTACHMENT
Filed June 4, 1945
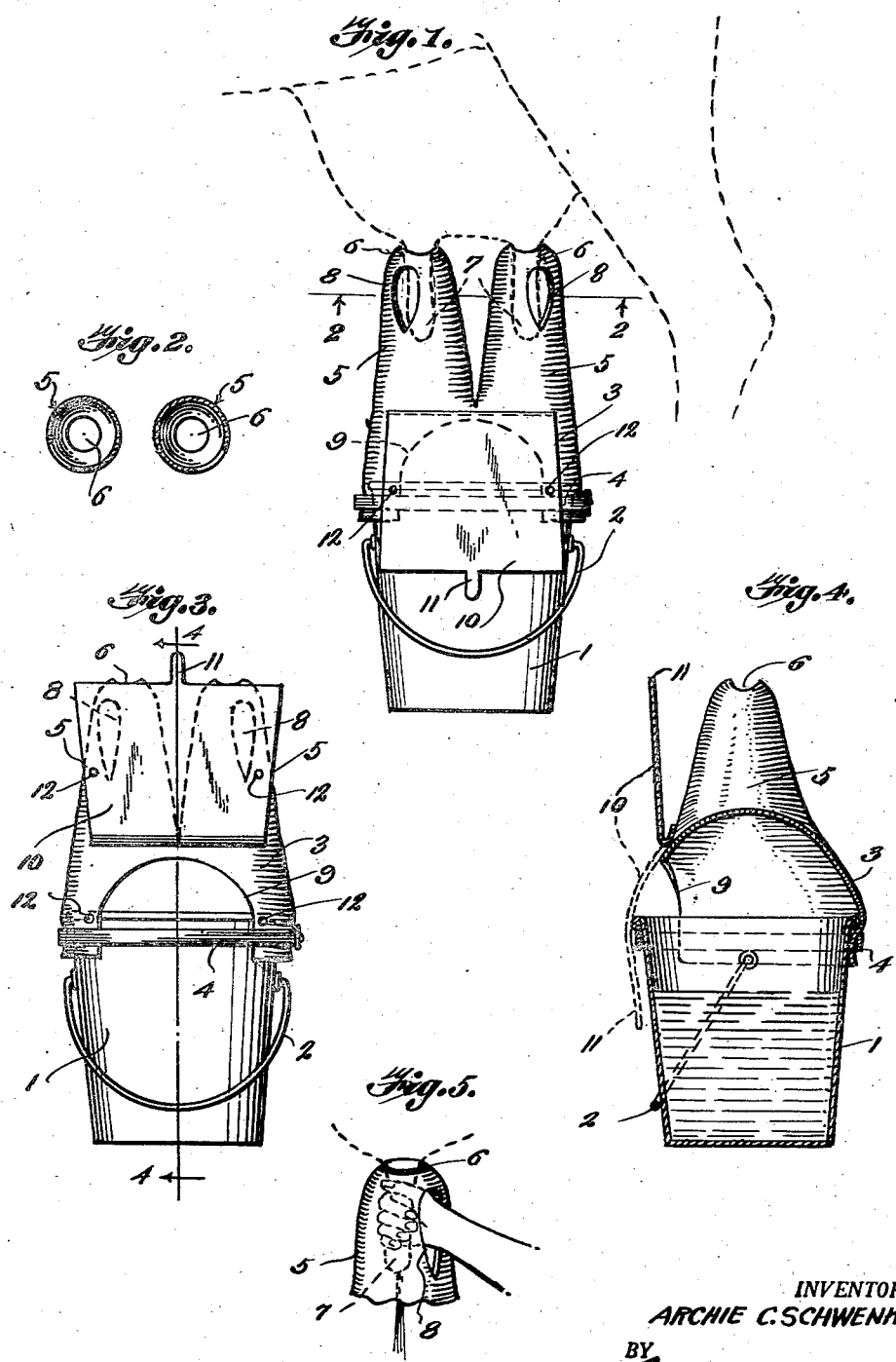
INVENTOR.
ARCHIE C. SCHWENKER
BY
[signature]

Patented Oct. 22, 1946

2,409,804

UNITED STATES PATENT OFFICE 2,409,804

MILK PAIL ATTACHMENT

Archie C. Schwenker, Lincoln, Nebr.

Application June 4, 1945, Serial No. 597,452

4 Claims. (Cl. 31—51)

This invention relates to an attachment for a milk pail and more particularly to a device adapted to be applied to a milk pail and serve to prevent dust and other foreign matter from dropping into a milk pail while cows are being milked and contaminating the milk.

Another object of the invention is to provide a device so formed that it may be detachably applied as a cover for the milk pail, the upper portion of the device being formed with portions adapted to be engaged with the teats of a cow and enclose the teats as well as the upper portion of the milk pail so that as the cow is milked there will be no danger of dust and other dirt about a cow barn entering the pail with the milk.

Another object of the invention is to provide a device of this character having its teat-engaging portions formed with openings through which hands may be passed to grasp the teats and thus allow the person milking a cow to have direct grasp upon the teats and really milk the cow in the usual manner without inconvenience to the cow or the person doing the milking.

Another object of the invention is to provide the device with a side opening through which milk may be poured from the milk pail without removing the cover or shield from the milk pail, there being an apron for normally closing the pouring opening which is normally in closing relation to this opening but may be readily raised when it is necessary to pour milk from the pail.

Another object of the invention is to provide a milk pail shield which is of simple construction and may be easily and quickly applied to or removed from a milk pail.

The invention is illustrated in the accompanying drawing wherein:

Figure 1 is a side elevation showing the shield applied to a milk pail and in use.

Figure 2 is a sectional view taken along line 2—2 of Figure 1.

Figure 3 is a side view showing the apron for closing the pouring opening of the shield moved to its raised position.

Figure 4 is a vertical sectional view taken along line 4—4 of Figure 3.

Figure 5 is a perspective view illustrating the manner in which a person milking a cow passes his hand through an opening and grasps the cow's teat when milking.

The milk pail 1 to which the improved shield has been shown applied is of conventional formation and may be of any desired capacity, the usual handle 2 being provided for lifting and carrying the pail. The attachment or cover 3 is formed of soft pliable material such as sheet rubber, rubberized fabric, or any other suitable material and has an annular lower portion which is open at its bottom and of such diameter that it may be engaged about the upper portion of the pail above the handle where it is secured by a strap 4 or other suitable device. The cover extends upwardly from the milk pail and has its upper portion formed with extensions 5 which taper upwardly and at their upper ends are formed with openings 6 of such size that a cow's teats 7 may be passed downwardly through the openings and a person who is to milk the cow then passes his hands inwardly through side openings 8 and grasps the teats in the usual manner, as shown in Figure 5. The openings 6 are of such diameter that the teats may be readily passed through them and since the shield is formed of sheet rubber its elasticity will cause it to fit snugly about the teats and prevent dust or other foreign matter from passing inwardly about the teats as the cow is milked. The openings 8 extend vertically in the portions 5 of the cover and taper towards their lower ends so that when a person's hands are passed through them the openings will substantially conform to the transverse outline of the wrists and cause the cover to fit snugly about the wrists and prevent foreign matter from entering the cover through these openings.

After the pail has been filled to normal capacity and milking has not been completed all or a portion of the milk must be poured from the pail and it is desirable to do so without removing the cover from the pail. Therefore a pouring opening 9 has been formed in the lower portion of the cover at a side thereof. This opening is of sufficient size to permit the milk to be freely poured from the pail and in order that the pouring opening may be normally closed there has been provided an apron 10 sewed or otherwise secured across its upper end to the cover above the pouring opening. This apron is of such length that it extends downwardly for overlapping engagement with a portion of the pail under the opening and at its lower end is provided with a tab or tongue 11 so that it may be grasped by a hand engaging the handle of the pail and the apron held in a raised position where it will be out of the way while milk is being poured from the milk pail. After the milking operation has been completed the strap 4 is loosened and the cover removed from the pail so that the pail and the cover may be thoroughly washed and sterilized before being again used. Since the cover is formed of soft pliable material, it may accommodate itself to a cow having a large bag and long teats or a cow having a small bag and short teats.

Companion snap fasteners 12 are provided upon the cover and the apron so that the apron will be held closed and prevented from being blown open or accidentally pushed transversely out of closing relation to the opening 9 while milking a cow.

Having thus described the invention, what is claimed is:

1. A sanitary cover for a milk pail comprising a body of flexible sheet material open at its bottom and having its upper portion formed with conical extensions formed at their upper ends with openings for receiving teats of a cow being milked, the said extensions having side portions thereof formed with hand holes located near upper ends of said extensions and extending vertically and tapered towards their lower ends, said body being of a diameter adapting its lower end to fit about the upper portion of a milk pail and having its lower portion formed at one side with a pouring opening, an apron for normally closing the pouring opening secured across its upper end to the body above the pouring opening, said apron being of a length adapting its lower portion to overlap a portion of a milk pail below the pouring opening and having its lower end provided with a tab constituting a finger hold for lifting the apron to a raised position out of blocking relation to the pouring opening, and a strap for encircling the lower portion of the body and binding the same to a pail.

2. A sanitary cover for a milk pail comprising an annular body formed of soft pliable material and having its lower end open and of a diameter adapting it to fit about the upper portion of a milk pail, said body having upwardly extending teat-receiving portions formed with openings at their upper ends for reception of teats, the said teat-receiving portions being also formed with hand holes in the side portions thereof, the lower portion of said body being formed with a pouring opening in one side, and an apron for normally closing the pouring opening secured across its upper end to the body above the pouring opening and being of a length adapting its lower portion to over-lap a portion of a milk pail under the pouring opening.

3. A sanitary cover for a milk pail comprising an annular body formed of soft material and having its lower end open and of a diameter adapting it to fit about the upper portion of a milk pail, said body having upwardly extending portions formed at their upper ends with teat-receiving openings and having side portions formed with hand holes.

4. A sanitary cover for a milk pail comprising an annular body formed of soft material and having its lower end open and of a diameter adapting it to fit about the upper portion of a milk pail, said body having upwardly extending teat-receiving portions tapered towards their upper ends and formed with teat-receiving openings at their tops, said teat-receiving portions having side portions formed with hand holes tapered towards their lower ends.

ARCHIE C. SCHWENKER.